United States Patent
Nakamoto

(10) Patent No.: US 12,084,582 B2
(45) Date of Patent: Sep. 10, 2024

(54) EMULSION FOR WATER-BASED INK AND INK COMPOSITION FOR WATER-BASED INK CONTAINING THE SAME

(71) Applicant: NIPPON SHOKUBAI CO., LTD., Osaka (JP)

(72) Inventor: Keiichi Nakamoto, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 584 days.

(21) Appl. No.: 17/419,363

(22) PCT Filed: Jan. 17, 2020

(86) PCT No.: PCT/JP2020/001408
§ 371 (c)(1),
(2) Date: Jun. 29, 2021

(87) PCT Pub. No.: WO2020/153240
PCT Pub. Date: Jul. 30, 2020

(65) Prior Publication Data
US 2022/0081577 A1    Mar. 17, 2022

(30) Foreign Application Priority Data
Jan. 23, 2019 (JP) ................................. 2019-009668

(51) Int. Cl.
*C09D 11/023* (2014.01)
*C09D 11/30* (2014.01)
*C09D 11/32* (2014.01)

(52) U.S. Cl.
CPC ............ *C09D 11/023* (2013.01); *C09D 11/30* (2013.01); *C09D 11/32* (2013.01)

(58) Field of Classification Search
CPC ........ C09D 11/023; C09D 11/30; C09D 11/32
USPC ....................................................... 523/201
See application file for complete search history.

(56) References Cited

U.S. PATENT DOCUMENTS

| 5,912,280 A | 6/1999 | Anton et al. |
| 6,197,878 B1 | 3/2001 | Murray et al. |
| 2003/0143344 A1 | 7/2003 | Yau et al. |
| 2013/0250021 A1 | 9/2013 | Shimomura et al. |
| 2015/0322282 A1 | 11/2015 | Matsumoto et al. |
| 2016/0244626 A1 | 8/2016 | Kagata et al. |
| 2016/0251528 A1 | 9/2016 | Mizutani et al. |
| 2017/0037268 A1 | 2/2017 | Wakabayashi et al. |

FOREIGN PATENT DOCUMENTS

| CN | 102617771 A | * | 8/2012 | |
| JP | H05-271598 A | | 10/1993 | |
| JP | 10-195362 A | | 7/1998 | |
| JP | 2002-302638 A | | 10/2002 | |
| JP | 2002-538250 A | | 11/2002 | |
| JP | 2003-205678 A | | 7/2003 | |
| JP | 2004-269558 A | | 9/2004 | |
| JP | 2006-096857 A | | 4/2006 | |
| JP | 2008-088427 A | | 4/2008 | |
| JP | 2010-126666 A | | 6/2010 | |
| JP | 2012-144629 A | | 8/2012 | |
| JP | 2012-201692 A | | 10/2012 | |
| JP | 2012-229301 A | | 11/2012 | |
| JP | 2013-226822 A | | 11/2013 | |
| JP | 2014-141672 A | | 8/2014 | |
| JP | 2015-124223 A | | 7/2015 | |
| JP | 2015-187236 A | | 10/2015 | |
| WO | WO-2018180284 A1 | * | 10/2018 | ............... B41J 2/01 |

OTHER PUBLICATIONS

International Search Report dated Mar. 17, 2020, issued in counterpart International Application No. PCT/JP2020/001408 (3 pages).
The Extended European Search Report dated Sep. 13, 2022, issued in counterpart EP Application No. 20744519.8. (9 pages).

* cited by examiner

*Primary Examiner* — Deve V Hall
(74) *Attorney, Agent, or Firm* — WHDA, LLP

(57) ABSTRACT

The emulsion for water-based inks of the present invention comprises an emulsion particle containing a polymer component having a glass transition temperature of 55° C. or more and a polymer component having a glass transition temperature of less than 55° C., and the emulsion particle having an acid value derived from carboxyl groups of 0 to 6. Further, the ink composition for water based inks of the present invention comprises the above-mentioned emulsion for water-based inks.

5 Claims, No Drawings

EMULSION FOR WATER-BASED INK AND INK COMPOSITION FOR WATER-BASED INK CONTAINING THE SAME

TECHNICAL FIELD

The present invention relates to an emulsion for water-based inks and an ink composition for water-based inks containing the same.

BACKGROUND

Inks, which are used in recording methods for printing by ejecting the inks from nozzles of printer heads and spraying them directly onto media to be printed, are required to have functions such as image uniformity and adhesion to the media to be printed with stable ejection. Further, since the printed media are wound into rolls, the printed inks are also required that blocking is suppressed. In recent years, in consideration of the environment, ink compositions having the above functions and being based on water have been demanded. Additionally, it is required to print on recording media for commercial printing on resin films which do not absorb liquids as the media to be printed, for examples: coated papers; polyester films such as polyethylene terephthalates (PET); polyvinyl chloride films; polypropylene films such as biaxially stretched polypropylene films (OPP); polyethylene films; nylon films; and the like.

Patent Literature 1 describes an acrylic resin emulsion for an aqueous inkjet ink, comprising a particulate acrylic resin having an acid value of 1 to 100 mgKOH/g. An acid-group-containing monomer is present at a content mole ratio (As) in surface regions of particles of the particulate acrylic resin and present at a content mole ratio (At) in the overall acrylic resin particles as measured with a $^1$H spin diffusion time of 5 ms, and a ratio (As/At) of the content mole ratio (As) to the content mole ratio (At) is not less than 9.

Patent Literature 2 describes a water-based ink for ink-jet printing, comprising a pigment (A), a water-insoluble polymer (B), an organic solvent (C) and water. The organic solvent (C) comprises diethylene glycol isopropyl ether (c1) and an organic solvent (c2) having a 1-octanol/water partition coefficient that is smaller than that of the diethylene glycol isopropyl ether (c1). And a total content of the pigment (A), the water-insoluble polymer (B) and the diethylene glycol isopropyl ether (c1) in the water-based ink is not less than 5.0% by mass. Further, a value obtained by multiplying a total content (% by mass) of the pigment (A) and the water-insoluble polymer (B) in the water-based ink by a content (% by mass) of the diethylene glycol isopropyl ether (c1) in the water-based ink is not less than 10 and not more than 300.

These inks have been required to have more excellent image uniformity, adhesion to the media to be printed, and blocking resistance.

CITATION LIST

Patent Literature

[Patent Literature 1] JP2014-141672
[Patent Literature 2] JP2015-124223

SUMMARY

Technical Problem

Therefore, an object of the present invention is to provide an emulsion for water-based inks, which is particularly preferable as an emulsion for water-based ink-jet inks, being excellent in image uniformity and adhesion, and having excellent blocking resistance, and to provide an ink composition for water-based inks containing the same.

Solution to Problem

As a result of intensive research to solve the above problems, the present inventor has found that an emulsion which contains two or more kinds of polymer components each having a specific glass transition temperature respectively and has a predetermined acid value, and a composition containing the same, are suitable for water-based inks and can solve the above problems. Then finally he has completed the present invention.

In the present invention, an emulsion for water-based inks comprises an emulsion particle containing a polymer component having a glass transition temperature of 55° C. or more and a polymer component having a glass transition temperature of less than 55° C., and the emulsion particle has an acid value derived from carboxyl groups of 0 to 6.

The emulsion particle preferably has a core-shell structure composed of a shell portion of the outermost layer and a core portion inside the shell portion. The core portion preferably contains the polymer component having the glass transition temperature of 55° C. or more, and the shell portion preferably contains the polymer component having the glass transition temperature of less than 55° C.

The shell portion preferably contains a polymer component having a glass transition temperature of 25° C. or less. The core portion preferably contains a polymer component having a glass transition temperature of 90° C. or more.

Further, an ink composition for water-based inks of the present invention comprises the above-mentioned emulsion for water-based inks.

Advantageous Effects of Invention

According to the emulsion for water-based inks and the ink composition for water-based inks containing the same of the present invention, the emulsion for water-based inks and the ink composition for water-based inks containing the same being excellent in image uniformity and adhesion, and having excellent blocking resistance, can be provided.

DESCRIPTION OF EMBODIMENTS

[Emulsion for Water-Based Inks]

The emulsion for water-based inks of the present invention comprises the emulsion particles containing the polymer components preferably obtained by emulsion-polymerization of monomer components. The emulsion particles contain the polymer component having the glass transition temperature of 55° C. or more and the polymer component having the glass transition temperature of less than 55° C., and has the acid value derived from the carboxyl groups of 0 to 6. The emulsion contains the emulsion particles and solvents such as water as components other than the emulsion particles. The components other than the emulsion particles are usually water. The emulsion for water-based inks of the present invention can be suitably used for printing for gravure, flexo, offset, or ink-jet, and more preferably for printing for gravure or ink-jet. Among them, it can be particularly suitably used as an emulsion for water-based ink-jet inks.

The monomer components include monofunctional monomers and polyfunctional monomers, and both of them can be used in the present invention. The monofunctional monomers and the polyfunctional monomers may be used alone, respectively, or may be used in combination.

Examples of the monofunctional monomers include ethylenically unsaturated double bond-containing monomers, but the monofunctional monomers are not limited to only these examples. These monomers may be used alone, respectively, or may be used in combination of two or more.

In addition, in this specification, "(meth) acrylate" means "acrylate" or "methacrylate", and "(meth) acryl" means "acryl" or "methacryl".

Examples of the ethylenically unsaturated double bond-containing monomers include acid group-containing monomers, alkyl (meth) acrylates, hydroxyl group-containing (meth) acrylates, piperidine group-containing monomers, oxo group-containing monomers, fluorine atom-containing monomers, nitrogen atom-containing monomers, epoxy group-containing monomers, alkoxyalkyl (meth) acrylates, silane group-containing monomers, carbonyl group-containing monomers, aziridinyl group-containing monomers, styrene type monomers, aralkyl (meth) acrylates, and addition-polymerizable oxazolines, but the ethylenically unsaturated double bond-containing monomers are not limited to only these examples. These ethylenically unsaturated double bond-containing monomers may be used alone, respectively, or may be used in combination of two or more.

Examples of the acid group-containing monomers include carboxyl group-containing aliphatic monomers such as (meth) acrylic acid, maleic acid, fumaric acid, crotonic acid, itaconic acid, citraconic acid, maleic anhydride, maleic acid monomethyl ester, maleic acid monobutyl ester, itaconic acid monomethyl ester, itaconic acid monobuthyl ester, and vinyl benzoic acid, but the present invention is not limited to only these examples. These acid group-containing monomers may be used alone, respectively, or may be used in combination of two or more. Among these acid group-containing monomers, acrylic acid, methacrylic acid or itaconic acid is preferable, and acrylic acid or methacrylic acid is more preferable, from the viewpoint of improving the dispersion stability of the emulsion particles.

Examples of the alkyl (meth) acrylates include alkyl (meth) acrylates each having 1 to 18 carbon atoms in the ester group such as methyl (meth) acrylate, ethyl (meth) acrylate, n-propyl (meth) acrylate, isopropyl (meth) acrylate, n-butyl (meth) acrylate, isobutyl (meth) acrylate, tert-butyl (meth) acrylate, sec-butyl (meth) acrylate, 2-ethylhexyl (meth) acrylate, n-octyl (meth) acrylate, tridecyl (meth) acrylate, cyclohexyl (meth) acrylate, n-lauryl (meth) acrylate, dodecyl (meth) acrylate, stearyl (meth) acrylate, and isobornyl (meth) acrylate, but the alkyl (meth) acrylates are not limited to only these examples. These alkyl (meth) acrylates may be used alone, respectively, or may be used in combination of two or more.

Examples of the hydroxyl group-containing (meth) acrylates include hydroxyl group-containing (meth) acrylates each having 1 to 18 carbon atoms in the ester group such as 2-hydroxyethyl (meth) acrylate, 2-hydroxypropyl (meth) acrylate, 3-hydroxypropyl (meth) acrylate, 2-hydroxybutyl (meth) acrylate, and 4-hydroxy butyl (meth) acrylate, but the hydroxyl group-containing (meth)acrylates are not limited to only these examples. These hydroxyl group-containing (meth) acrylates may be used alone, respectively, or may be used in combination of two or more.

Examples of the piperidine group-containing monomers include 4-(meth) acryloyloxy-2,2,6,6-tetramethylpiperidine, 4-(meth) acryloylamino-2,2,6,6-tetramethylpiperidine, 4-(meta) acryloyloxy-1,2,2,6,6-pentamethylpiperidin, 4-(meth) acryloyl-1-methoxy-2,2,6,6-tetramethylpiperidine, 4-cyano-4-(meta) acryloyloxy-2,2,6,6-tetramethylpiperidine, 1-(meth) acryloyl-4-(meth) acryloylamino-2,2,6,6-tetramethylpiperidine, 4-crotonoylamino-2,2,6,6-tetramethylpiperidine, 4-(meth) acryloylamino-1,2,2,6,6-pentamethylpiperidine, 4-cyano-4-(meth) acryloylamino-2,2,6,6-tetramethylpiperidine, 4-crotonoyloxy-2,2,6,6-tetramethylpiperidine, 1-(meth) acryloyl-4-cyano-4-(meth) acryloylamino-2,2,6,6-tetramethylpiperidin, and 1-crotonoyl-4-crotonoyloxy-2,2,6,6-tetramethylpiperidine, but the piperidine group-containing monomers are not limited to only these examples. These piperidine group-containing monomers may be used alone, respectively, or may be used in combination of two or more.

Examples of the oxo group-containing monomers include (di) ethylene glycol (methoxy) (meth) acrylates such as ethylene glycol (meth) acrylate, ethylene glycol methoxy (meth) acrylate, diethylene glycol (meth) acrylate, and diethylene glycol methoxy (meth) acrylate, but the oxo group-containing monomers are not limited to only these examples. These oxo group-containing monomers may be used alone, respectively, or may be used in combination of two or more.

Examples of the fluorine atom-containing monomers include fluorine atom-containing alkyl (meth) acrylates each having 2 to 6 carbon atoms in the ester group such as trifluoroethyl (meth) acrylate, tetrafluoropropyl (meth) acrylate, and octafluoropentyl (meth) acrylate, but the fluorine atom-containing monomers are not limited to only these examples. These fluorine atom-containing monomers may be used alone, respectively, or may be used in combination of two or more.

Examples of the nitrogen atom-containing monomers include: acrylamide compounds such as (meth) acrylamide, N-monomethyl (meth) acrylamide, N-monoethyl (meth) acrylamide, N, N-dimethyl (meth) acrylamide, N-n-propyl (meth) acrylamide, N-isopropyl (meth) acrylamide, methylenebis (meth) acrylamide, N-methylol (meth) acrylamide, N-butoxymethyl (meth) acrylamide, dimethylaminoethyl (meth) acrylamide, N, N-dimethylaminopropylacrylamide, and diacetoneacrylamide; nitrogen atom-containing (meth) acrylate compounds such as dimethylaminoethyl (meth) acrylate and diethylaminoethyl (meth) acrylate; N-vinylpyrrolidone; and (meth) acrylonitrile, but the nitrogen atom-containing monomers are not limited to only these examples. These nitrogen atom-containing monomers may be used alone, respectively, or may be used in combination of two or more.

Examples of the epoxy group-containing monomers include epoxy group-containing (meth) acrylates such as glycidyl (meth) acrylate, α-methylglycidyl (meth) acrylate, and glycidyl allyl ether, but the epoxy group-containing monomers are not limited to only these examples. These epoxy group-containing monomers may be used alone, respectively, or may be used in combination of two or more.

Examples of the alkoxyalkyl (meth) acrylates include methoxyethyl (meth) acrylate, methoxybutyl (meth) acrylate, ethoxybutyl (meth) acrylate, and trimethylolpropane tripropoxy (meth) acrylate, but the alkoxyalkyl (meth) acrylates are not limited to only these examples. These alkoxyalkyl (meth) acrylates may be used alone, respectively, or may be used in combination of two or more.

Examples of the silane group-containing monomers include vinyltrimethoxy silane, vinyltriethoxy silane, vinyltri (methoxyethoxy) silane, γ-(meth) acryloyloxy propyltrimethoxy silane, 2-styrylethyl trimethoxy silane, vinyltrichloro silane, γ-(meth) acryloyloxy propylhydroxy silane, and γ-(meth) acryloyloxy propylmethylhydroxy silane, but the silane group-containing monomers are not limited to only these examples. These silane group-containing monomers may be used alone, respectively, or may be used in combination of two or more.

Examples of the carbonyl group-containing monomers include acrolein, formylstyrene, vinyl ethyl ketone, (meth) acrylic oxyalkylpropenal, acetonyl (meth) acrylate, diacetone (meth) acrylate, 2-hydroxypropyl (meth) acrylate acetylacetate, butanediol-1,4-acrylate acetylacetate, and 2-(acetoacetoxy) ethyl (meth) acrylate, but the carbonyl group-containing monomers are not limited to only these examples. These carbonyl group-containing monomers may be used alone, respectively, or may be used in combination of two or more.

Examples of the aziridinyl group-containing monomers include (meth) acryloyl aziridine and 2-aziridinyl ethyl (meth) acrylate, but the aziridinyl group-containing monomers are not limited to only these examples. These aziridinyl group-containing monomers may be used alone, respectively, or may be used in combination of two or more.

Examples of the styrene type monomers include styrene, α-methylstyrene, p-methylstyrene, tert-methylstyrene, chlorostyrene, and vinyltoluene, but the styrene type monomers are not limited to only these examples. These styrene type monomers may be used alone, respectively, or may be used in combination of two or more. The styrene type monomers may have functional groups, for example alkyl groups such as methyl groups and tert-butyl groups, nitro groups, nitrile groups, alkoxyl groups, acyl groups, sulfone groups, hydroxyl groups, halogen atoms and the like on the benzene ring. Among the styrene type monomers, styrene is preferable, from the viewpoint of increasing the water resistance.

Examples of the aralkyl (meth) acrylates include aralkyl (meth) acrylates each having 7 to 18 carbon atoms in the aralkyl group such as benzyl (meth) acrylate, phenylethyl (meth) acrylate, methylbenzyl (meth) acrylate, and naphthylmethyl (meth) acrylate, but the aralkyl (meth) acrylates are not limited to only these examples. These aralkyl (meth) acrylates may be used alone, respectively, or may be used in combination of two or more.

Examples of the addition-polymerizable oxazolines include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline, but the addition-polymerizable oxazolines are not limited to only these examples. These addition-polymerizable oxazolines may be used alone, respectively, or may be used in combination of two or more. Among these addition-polymerizable oxazolines, 2-isopropenyl-2-oxazoline is preferable because it is easily available.

Examples of the preferable monofunctional monomers include alkyl (meth) acrylates, hydroxyl group-containing (meth) acrylates, piperidine group-containing monomers, oxo group-containing monomers, fluorine atom-containing monomers, nitrogen atom-containing monomers, epoxy group-containing monomers, and styrene type monomers, and these monomers may be used alone, respectively, or may be used in combination of two or more. Among the monofunctional monomers, from the viewpoint of further improving adhesion to corona-treated PET, OPP, and the like, the piperidine group-containing monomers, the nitrogen atom-containing monomers, or the addition-polymerizable oxazolines is preferable, the piperidine group-containing monomers or the addition-polymerizable oxazolines is more preferable, and 4-(meth) acryloyloxy-2,2,6,6-tetramethylpiperidin, 4-(meth) acryloyloxy-1,2,2,6,6-pentamethyl piperidin or 2-isopropenyl-2-oxazoline is further preferable. Further, it is preferable to contain the hydroxyl group-containing (meth) acrylates, because the emulsion particles without coarse particles can be easily obtained and the ejection stability of the ink containing these emulsion particles becomes excellent when the hydroxyl group-containing (meth) acrylates are contained as the monofunctional monomers.

The piperidine group-containing monomers, the addition-polymerizable oxazolines, and the hydroxyl group-containing (meth) acrylates are each contained in the monomer components in an amount of preferably 0.1% by mass or more, more preferably 0.2% by mass or more, and further preferably 0.5% by mass or more, from the viewpoint of further improving weather resistance and adhesion, and preferably 30% by mass or less, more preferably 20% by mass or less, and further preferably 10% by mass or less, from the viewpoint of improving water resistance. The piperidine group-containing monomers, the addition-polymerizable oxazolines, and the hydroxyl group-containing (meth) acrylates are each contained in the monomer components in an amount of more preferably 0.1 to 30% by mass, even more preferably 0.2 to 20% by mass, and further preferably 0.5 to 10% by mass.

When the emulsion particles are formed of a plurality of layers, the piperidine group-containing monomers and/or the addition-polymerizable oxazolines and/or the hydroxyl group-containing (meth) acrylates may be contained in the monomer components forming any layers. From the viewpoint of further improving adhesion, it is preferably that the piperidine group-containing monomers and/or the addition-polymerizable oxazolines and/or the hydroxyl group-containing (meth) acrylates are/is contained in at least the monomer components forming the outermost layer. Therefore, it is preferable: that the monomer components contain the piperidine group-containing monomers and/or the addition-polymerizable oxazolines and/or the hydroxyl group-containing (meth) acrylates: that when the emulsion particles are formed of the plurality of layers, at least the monomer components forming the outermost layer contain the piperidine group-containing monomers and/or the addition-polymerizable oxazolines and/or the hydroxyl group-containing (meth) acrylates; and that the piperidine group-containing monomers, the addition-polymerizable oxazolines, and the hydroxyl group-containing (meth) acrylates are each contained in the monomer components in an amount of more preferably 0.1 to 30% by mass, even more preferably 0.2 to 20% by mass, and further preferably 0.5 to 10% by mass.

Examples of the polyfunctional monomers include: di (meth) acrylates of polyhydric alcohol each having 1 to 10 carbon atoms such as ethylene glycol di (meth) acrylate, propylene glycol di (meth) acrylate, 1,3-butanediol di (meth) acrylate, 1,4-butanediol di (meth) acrylate, 1,6-hexanediol di (meth) acrylate, ethylene oxide-modified 1,6-hexanediol di (meth) acrylate, 1,9-nonanediol di (meth) acrylate, propylene oxide-modified neopentyl glycol di (meth) acrylate and tripropylene glycol di (meth) acrylate: alkyldi (meth) acrylates in which number of moles of alkylene oxide groups each having 2 to 4 carbon atoms added is 2 to 50 such as polyethylene glycol di (meth) acrylate in which number of moles of ethylene oxide groups added is 2 to 50, polypropylene glycol di (meth) acrylate in which number of moles of propylene oxide groups added is 2 to 50, and tripropylene glycol di (meth) acrylate; tri (meth) acrylates of polyhydric alcohol each having 1 to 10 carbon atoms such as ethoxylated glycerin tri (meth) acrylate, propylene oxide-modified glycerol tri (meth) acrylate, ethylene oxide-modified trimethylolpropane tri (meth) acrylate, trimethylolpropane tri (meth) acrylate, pentaerythritol monohydroxy tri (meth) acrylate, and trimethylolpropane triethoxy tri (meth) acrylate: tetra (meth) acrylates of polyhydric alcohol each having 1 to 10 carbon atoms such as pentaerythritol tetra (meth) acrylate, dipentaerythritol tetra (meth) acrylate and ditrimethylolpropane tetra (meth) acrylate; penta (meth) acrylates of polyhydric alcohol each having 1 to 10 carbon atoms such as pentaerythritol penta (meth) acrylate and dipentaerythritol (monohydroxy) penta (meth) acrylate; hexa (meth) acrylates of polyhydric alcohol having each 1 to 10 carbon atoms such as pentaerythritol hexa (meth) acrylate; epoxy group-containing (meth) acrylates such as bisphenol A di (meth) acrylate, 2-(2'-vinyloxyethoxyethyl) (meth) acrylate and epoxy (meth) acrylate; and polyfunctional (meth) alcohols such as urethane (meth) acrylate, but the polyfunctional monomers are not limited to only these examples. These polyfunctional monomers may be used alone, respectively, or may be used in combination of two or more.

Among the polyfunctional monomers, from the viewpoint of achieving both blocking resistance and adhesion, alkyl di (meth) acrylates each having 2 hydroxyl groups and each having 4 to 8 carbon atoms in the alkyl group, polyethylene glycol di (meth) acrylates in which number of moles of ethylene oxide groups added is 2 to 50, polypropylene glycol di (meth) acrylates in which number of moles of propylene oxide group added is 2 to 50, tri (meth) acrylates of polyhydric alcohol, tetra (meth) acrylates of polyhydric alcohol, penta (meth) acrylates of polyhydric alcohol or hexa (meth) acrylates of polyhydric alcohol is preferable, and ethylene glycol di (meth) acrylate, polyethylene glycol di (meth) acrylates
in which number of moles of ethylene oxide groups added is 2 to 50, 1, 4-butandiol di (meth) acrylate, trimethylolpropane tri (meth) acrylate, dipentaerythritol tetra (meth) acrylate or ditrimethylolpropane tetra (meth) acrylate is more preferable.

Further, in the present invention, from the viewpoint of imparting ultraviolet absorption to the emulsion particles, ultraviolet absorbing monomers may be contained in the monomer components within a range in which the objects of the present invention are not impaired.

Examples of the ultraviolet-absorbing monomers include benzotriazole type ultraviolet-absorbing monomers and benzophenone type ultraviolet-absorbing monomers, but the ultraviolet-absorbing monomers are not limited to only these examples. These ultraviolet-absorbing monomers may be used alone, respectively, or may be used in combination of two or more.

Examples of the benzotriazole type ultraviolet absorbing monomers include 2-[2'-hydroxy-5'-(meth) acryloyloxy methylphenyl]-2H-benzotriazole, 2-[2'-hydroxy-5'-(meta) acryloyloxy ethylphenyl]-2H-benzotriazole, 2-[2'-hydroxy-5'-(meth) acryloyloxy methylphenyl]-5-tert-butyl-2H-benzotriazole, 2-[2'-hydroxy-5'-(meth) acryloylamino methyl-5'-tert-octylphenyl]-2H-benzotriazole, 2-[2'-hydroxy-5'-(meth) acryloyloxy propylphenyl]-2H-benzotriazole, 2-[2'-hydroxy-5'-(meth) acryloyloxy hexylphenyl]-2H-benzotriazole, 2-[2'-hydroxy-3'-tert-butyl-5'-(meth) acryloyloxy ethylphenyl]-2H-benzotriazole, 2-[2'-hydroxy-3'-tert-butyl-5'-(meth) acryloyloxy ethylphenyl]-5-chloro-2H-benzotriazole, 2-[2'-hydroxy-5'-tert-butyl-3'-(meth) acryloyloxy ethylphenyl]-2H-benzotriazole, 2-[2'-hydroxy-5'-(meth) acryloyloxy ethylphenyl]-5-chloro-2H-benzotriazole, 2-[2'-hydroxy-5'-(meth) acryloyloxy ethylphenyl]-5-cyano-2H-benzotriazole, 2-[2'-hydroxy-5'-(meth) acryloyloxy ethylphenyl]-5-tert-butyl-2H-benzotriazole and 2-[2'-hydroxy-5'-(β-(meth) acryloyloxyethoxy)-3'-tert-butylphenyl]-4-tert-butyl-2H-benzotriazole, but the benzotriazole type ultraviolet absorbing monomers are not limited to only these examples. These benzotriazole type ultraviolet absorbing monomers may be used alone, respectively, or may be used in combination of two or more.

Examples of the benzophenone type ultraviolet absorbing monomers include 2-hydroxy-4-(meth) acryloyloxy benzophenone, 2-hydroxy-4-[2-hydroxy-3-(meth) acryloyloxy] propoxybenzophenone, 2-hydroxy-4-[2-(meth) acryloyloxy]ethoxybenzophenone, 2-hydroxy-4-[3-(meth) acryloyloxy-2-hydroxypropoxy]benzophenone, and 2-hydroxy-3-tert-butyl-4-[2-(meta) acryloyloxy]butoxybenzophenone, but the benzophenone type ultraviolet absorbing monomers are not limited to only these examples. These benzophenone type ultraviolet absorbing monomers may be used alone, respectively, or may be used in combination of two or more.

Examples of methods of emulsion-polymerization of the monomer components include: methods having dissolving process of dissolving emulsifiers in media such as water and aqueous media containing water and water-soluble organic solvents, for example, lower alcohols such as methanol, and having dropping process of dropping the monomer components and polymerization initiators into the media under stirring; and methods having dropping process of dropping the monomer components pre-emulsified with the emulsifiers and water into water or the aqueous media, but the methods are not limited to only these methods. An amount of the media may be appropriately set in consideration of a content of non-volatile matter contained in the emulsion to be obtained. The media may be charged in a reaction vessel in advance, or may be used as a pre-emulsion. Further, if necessary, the media may be used when the monomer components are being emulsion-polymerized to prepare the emulsion.

When the monomer components are emulsion-polymerized, the monomer components may be emulsion-polymerized after mixing the monomer components, the emulsifiers and the media, or the monomer components may be emulsion-polymerized after preparing the pre-emulsion by stirring the monomer components, the emulsifiers and the media to be emulsified, or the monomer components may be emulsion-polymerized by mixing at least one of the monomer components, the emulsifiers and the media with the pre-emulsion of the rest thereof. Each of the monomer components, the emulsifiers and media may be added all at once, may be added in portions, or may be continuously added dropwise.

When an outer layer composed of a polymer component for the outer layer is formed on the emulsion particles contained in the emulsion obtained above, the outer layer can be formed on the emulsion particles by emulsion-polymerizing monomer components in the above emulsion in the same manner as described above. Further, when the other outer layer is further formed on the emulsion particles on which the outer layer (intermediate layer) is formed, the other outer layer composed of a polymer component for the other outer layer can be further formed on the emulsion particles by emulsion-polymerizing monomer components in the above emulsion in the same manner as described above. As described above, emulsion particles having a multi-layer structure (core-shell emulsion particles) can be prepared by the multi-stage emulsion-polymerization method.

When preparing the core-shell emulsion particles, one or more stages of emulsion-polymerization may be carried out before carrying out emulsion-polymerization for forming an inner layer composed of a polymer component for the inner layer first, or, one or more stages of emulsion-polymerization may be carried out between the emulsion-polymerization for forming the inner layer and the emulsion-polymerization for forming the intermediate layer. Further, one or more stages of emulsion-polymerization may be carried out between the emulsion-polymerization for forming the intermediate layer and the emulsion-polymerization for forming the outer layer. Additionally, one or more stages of emulsion-polymerization may be carried out after carrying out emulsion-polymerizingion for forming the outer layer.

Examples of the emulsifiers include anionic emulsifiers, nonionic emulsifiers, cationic emulsifiers, amphoteric emulsifiers, and polymer emulsifiers, and these emulsifiers may be used alone, respectively, or may be used in combination of two or more.

Examples of the anionic emulsifiers include: alkyl sulfate salts such as ammonium dodecyl sulfate and sodium dodecyl sulfate; alkyl sulfonate salts such as ammonium dodecyl sulfonate, sodium dodecyl sulfonate, and sodium alkyldiphenylether disulfonate; alkyl aryl sulfonate salts such as ammonium dodecylbenzene sulfonate and sodium dodecylnaphthalene sulfonate; polyoxyethylene alkyl sulfonate salts; polyoxyethylene alkyl sulfate salts; polyoxyethylene alkylaryl sulfate salts; dialkyl sulfosuccinates; aryl sulfonic acid-formalin condensates; fatty acid salts such as ammonium laurylate and sodium stearilate; sulfate esters or salts thereof having allyl groups such as bis (polyoxyethylene polycyclic phenyl ether) methacrylate sulfonate salts, propenyl-alkyl sulfosuccinate ester salts, (meth) acrylate polyoxyethylene sulfonate salts, (meth) acrylate polyoxyethylene phosphonate salts, and allyl oxymethylalkyloxy polyoxyethylene sulfonate salts; sulfate ester salts of allyloxymethylalkoxyethyl polyoxyethylene; and polyoxyalkylene alkenyl ether sulfate ammonium salts, but the anionic emulsifiers are not limited to only these examples.

Examples of the nonionic emulsifiers include polyoxyethylene alkyl ethers, polyoxyethylene alkyl aryl ethers, condensates of polyethylene glycols with polypropylene glycols, sorbitan fatty acid esters, polyoxyethylene sorbitan fatty acid esters, fatty acid monoglycerides, condensates of ethylene oxides with aliphatic amines, allyloxymethyl alkoxyethylhydroxy polyoxyethylenes, and polyoxyalkylene alkenyl ethers, but the nonionic emulsifiers are not limited to only these examples.

Examples of the cationic emulsifiers include alkylammonium salts such as dodecylammonium chloride, but the cationic emulsifiers are not limited to only these examples.

Examples of the amphoteric emulsifiers include betaine ester type emulsifiers, but the amphoteric emulsifiers are not limited to only these examples.

Examples of the polymer emulsifiers include poly (meth) acrylate salts such as sodium polyacrylate; polyvinyl alcohol; polyvinylpyrrolidone; polyhydroxyalkyl (meth) acrylates such as polyhydroxyethyl acrylate; and copolymers containing copolymer components derived from one or more monomers constituting these polymers, but the polymer emulsifiers are not limited to only these examples.

Further, as the above-mentioned emulsifiers, emulsifiers having a polymerizable group, that is, a so-called reactive emulsifiers are preferable from the viewpoint of further improving water resistance and image uniformity, and non-nonylphenyl type emulsifiers are preferable from the viewpoint of environmental protection.

Examples of the reactive emulsifiers include propenyl-alkyl sulfosuccinate salts, (meth) acrylate polyoxyethylene sulfonate salts, (meth) acrylate polyoxyethylene phosphonate salts [for example, manufactured by Sanyo Chemical Industries, Ltd., trade name: ELEMINOR RS-30, etc.], polyoxyethylene alkylpropenylphenyl ether sulfonate salts [for example, manufactured by DKS Co., Ltd., trade name: AQUALON HS-10, etc.], allyloxymethylalkyloxypolyoxyethylene sulfonate salts [for example, manufactured by DKS Co., Ltd., trade name: AQUALON KH-10, etc.], sulfonate salts of allyloxymethylnonyl phenoxyethyl hydroxypolyoxyethylene [for example, manufactured by ADEKA Corporation, trade name: ADEKA REASOAP SE-10, etc.], allyloxymethylalkoxyethyl hydroxyl polyoxyethylene sulfate ester salts [for example, manufactured by ADEKA Corporation, trade name: ADEKA REASOAP SR-10, SR-30, etc.], bis (polyoxyethylene polycyclic phenyl ether) methacrylate sulfonate salts [for example, manufactured by Nippon Nyukazai Co., Ltd., trade name: ANTOX MS-60, etc.], allyloxymethylalkoxyethyl hydroxypolyoxyethylene [for example, manufactured by ADEKA Corporation, trade name: ADEKA REASOAP ER-20, etc.], polyoxyethylene alkylpropenylphenyl ethers [for example, manufactured by DKS Co., Ltd., trade name: AQUALON RN-20, etc.], and allyloxymethylnonyl phenoxyethyl hydroxypolyoxyethylene [for example, ADEKA Corporation, trade name: ADEKA REASOAP NE-10, etc.), but the reactive emulsifiers are not limited to only these examples.

An amount of the emulsifiers per 100 parts by mass of the monomer components is preferably 0.5 parts by mass or more, more preferably 1 part by mass or more, further preferably 2 parts by mass or more, and particularly preferably 3 parts by mass or more, from the viewpoint of improving the polymerization stability. The amount of the emulsifiers per 100 parts by mass of the monomer components is preferably 10 parts by mass or less, and more preferably 6 parts by mass or less, from the viewpoint of improving water resistance.

Examples of the polymerization initiators include: azo compounds such as azobisisobutyronitrile, 2,2-azobis (2-methylbutyronitrile), 2,2-azobis (2,4-dimethylvaleronitrile), 2,2-azobis (2-diaminopropane) hydrochloride, 4,4-azobis (4-cyanovaleric acid), and 2,2-azobis (2-methylpropionamidine) persulfates such as ammonium persulfate and potassium persulfate; and peroxides such as hydrogen peroxide, benzoyl peroxide, parachlorobenzoyl peroxide, lauroyl peroxide, and ammonium peroxide, but the polymerization initiators are not limited to only these examples. These polymerization initiators may be used alone, respectively, or may be used in combination of two or more.

An amount of the polymerization initiators per 100 parts by mass of the monomer components is preferably 0.05 parts by mass or more, and more preferably 0.1 part by mass or more, from the viewpoint of increasing the polymerization speed and reducing the residual amount of the unreacted monomer components. The amount of the polymerization initiators per 100 parts by mass of the monomer components is preferably 1 part by mass or less, and more preferably 0.5 part by mass or less, from the viewpoint of improving water resistance.

Addition methods of adding the polymerization initiators are not particularly limited. Examples of the addition methods include batch preparation, split preparation, and continuous dropping. Further, from the viewpoint of accelerating the end time of the polymerization reaction, a part of the polymerization initiators may be added before or after the completion of adding the monomer components into the reaction system.

In order to promote the decomposition of the polymerization initiators, for example, reducing agents such as sodium bisulfite, and decomposition agents of the polymerization initiators may be added in an appropriate amount into the reaction system. Examples of the decomposition agents of the polymerization initiators include transition metal salts such as ferrous sulfate.

In addition, chain transfer agents can be used in order to adjust a weight average molecular weight of the emulsion particles. Examples of the chain transfer agents include 2-ethylhexyl thioglycolate, tert-dodecyl mercaptan, n-octyl mercaptan, n-dodecyl mercaptan, mercaptoacetic acid, mercaptopropionic acid, 2-mercaptoethanol, α-methylstyrene, and α-methyl styrene dimers, but the chain transfer agents are not limited to only these examples.

These chain transfer agents may be used alone, respectively, or may be used in combination of two or more. An amount of the chain transfer agents per 100 parts by mass of the monomer components is preferably 0.01 to 10 parts by mass, from the viewpoint of appropriately adjusting the weight average molecular weight of the emulsion particles.

Further, if necessary, additives such as pH buffers, chelating agents and film-forming auxiliary agents may be added to the reaction system. Since an amount of the additives varies depending on the type of additives, it cannot be determined unconditionally. Usually, the amount of the additives per 100 parts by mass of the monomer components is preferably about 0.01 to 5 parts by mass, and more preferably about 0.1 to 3 parts by mass.

An atmosphere of the emulsion-polymerization of the monomer components is not particularly limited, but is preferably inert gases such as nitrogen gas, from the viewpoint of increasing the efficiency of the polymerization initiators.

A polymerization temperature, when emulsion-polymerizing the monomer components, is not particularly limited, but is usually preferably 50 to 100° C., and more preferably 60 to 95° C. The polymerization temperature may be constant or may be changed during the polymerization reaction.

A polymerization time for emulsion-polymerizing the monomer components is not particularly limited, and may be appropriately set according to the progress of the polymerization reaction, but is usually about 2 to 9 hours.

When the monomer components are emulsion-polymerized, a part or all of the acidic groups contained in the obtained polymer components may be neutralized with neutralizing agents. The neutralizing agents may be used in the final stage after adding the monomer components, may be used between the first-stage polymerization reaction and the second-stage polymerization reaction for example, and may be used at the end of the initial emulsion-polymerization reaction.

Examples of the neutralizing agents include alkaline substances such as: hydroxides of alkali metals and alkaline earth metals, for example, sodium hydroxide and the like; carbonates of alkali metals and alkaline earth metals, for example, sodium hydrogen carbonate, calcium carbonate and the like; and organic amines, for example, ammonia, monomethylamine, dimethylaminoethanol and the like, but the neutralizing agents are not limited to only these examples. Among these neutralizing agents, the volatile alkaline substances such as ammonia are preferable from the viewpoint of improving water resistance, and sodium hydrogen carbonate is preferable from the viewpoint of improving the storage stability of the emulsion particles. The neutralizing agents can be used, for example, as aqueous solutions thereof.

Further, when the monomer components are emulsion-polymerized, silane coupling agents may be used in an appropriate amount, from the viewpoint of improving water resistance. Examples of the silane coupling agents include silane coupling agents having polymerizable unsaturated bonds such as a (meth) acryloyl group, a vinyl group, an allyl group, and a propenyl group, but the silane coupling agents are not limited to only these examples. In addition, "(meth) acryloyl" means "acryloyl" or "metacryloyl".

By emulsion-polymerizing of the monomer components as described above, the emulsions containing the emulsion particles can be obtained.

When the outer layer are formed on the emulsion particles obtained above, it is preferable to emulsion-polymerize the monomer components constituting the outer layer after reaching a reaction rate of the emulsion particles polymerization of 90% or more, preferably 95% or more, from the viewpoint of forming a layer-separated structure in the emulsion particles.

After forming the inner layer of the emulsion particles and before forming the outer layer, if necessary, the layer composed of the other polymer component may be formed within a range in which the objects of the present invention are not impaired. Therefore, when producing the emulsion particles contained in the emulsion for water-based inks of the present invention, if necessary, after forming the inner layer of the emulsion particles and before forming the outer layer, the layer composed of the other polymer component may be formed within a range in which the objects of the present invention are not impaired.

The monomer components used for forming the outer layer can be the same as the monomer components used as raw materials for the inner layer of the emulsion particles. Further, the emulsion-polymerization method and polymerization conditions for forming the outer layer can be the same as the method and polymerization conditions for producing the inner layer of the emulsion particles.

The emulsion particles having the inner layer and the outer layer can be obtained as described above. If necessary, a surface layer composed of another polymer component may be further formed on a surface of the outer layer, within a range in which the objects of the present invention are not impaired.

After preparing the inner layer of the emulsion particles as described above, by forming the outer layer on the inner layer, the emulsion particles having the inner layer and the outer layer can be obtained.

By further adding cross-linking agents to the emulsion, cross-linking property can be imparted. The cross-linking agents may be the ones that start the cross-linking reaction at room temperature, or the ones that start the cross-linking reaction by heat. In the emulsion for water-based inks of the present invention, blocking resistance and adhesion can be further improved by incorporating the cross-linking agents into the emulsion particles.

Preferable examples of the cross-linking agents include oxazoline group-containing compounds, isocyanate group-containing compounds and aminoplast resins. These cross-linking agents may be used alone, respectively, or may be used in combination of two or more. Among these cross-linking agents, the oxazoline group-containing compounds are preferable from the viewpoint of improving the storage stability of the emulsion for water-based inks of the present invention.

The oxazoline group-containing compounds are compounds having two or more oxazoline groups in each molecule. Examples of the oxazoline group-containing compounds include 2,2'-bis (2-oxazoline), 2,2'-methylene-bis (2-oxazoline), 2,2'-ethylene-bis (2-oxazoline), 2,2'-trimethylene-bis (2-oxazoline), 2,2'-tetramethylene-bis (2-oxazoline), 2,2'-hexamethylene-bis (2-oxazoline), 2,2'-octamethylene-bis (2-oxazoline), 2,2'-ethylene-bis (4,4'-dimethyl-2-oxazoline), 2,2'-p-phenylene-bis (2-oxazoline), 2,2'-m-phenylene-bis (2-oxazoline), 2,2'-m-phenylene-bis (4,4'-dimethyl-2-oxazoline), bis (2-oxazolinylcyclohexane) sulfide, bis (2-oxazolinylnorbornan) sulfides, and oxazoline ring-containing polymers, but the oxazoline group-containing compounds are not limited to only these examples. These oxazoline group-containing compounds may be used alone, respectively, or may be used in combination of two or more. Among the oxazoline group-containing compounds, water-soluble oxazoline group-containing compounds are preferable, and water-soluble oxazoline ring-containing polymers are more preferable, from the viewpoint of improving reactivity.

The oxazoline ring-containing polymers contain addition-polymerizable oxazolines as an essential component, and if necessary, can be easily prepared by polymerizing monomer components containing monomers copolymerizable with addition-polymerizable oxazoline.

As the addition-polymerizable oxazolines, the ones similar to the examples indicated as the ethylenically unsaturated double bond-containing monomers can be used preferably.

The oxazoline group-containing compounds can be easily obtained commercially as, for example, trade names of Epocross WS-500, Epocross WS-700, Epocross K-2010, Epocross K-2020, and Epocross K-2030 manufactured by Nippon Shokubai Co., Ltd. and the like. Among them, the water-soluble oxazoline group-containing compounds such as trade name of Epocross WS-500 and Epocross WS-700 manufactured by Nippon Shokubai Co., Ltd. are preferable from the viewpoint of improving reactivity.

The isocyanate group-containing compounds are compounds containing isocyanate groups which can react with the hydroxyl groups contained as functional groups in the hydroxyl group-containing monomers used as the monomer components.

Examples of the isocyanate group-containing compounds include water-dispersed (blocked) polyisocyanates. The (blocked) polyisocyanates mean polyisocyanates and/or blocked polyisocyanates.

Examples of the water-dispersed polyisocyanates include ones dispersing polyisocyanates, which are imparted with hydrophilicity by polyethylene oxide chains, in water with anionic dispersants or nonionic dispersants.

Examples of the polyisocyanates include: diisocyanates such as hexamethylene diisocyanate and isophorone diisocyanate; and derivatives (modified products) of polyisocyanates such as trimethylolpropane adducts, biurets, and isocyanurates of these diisocyanates. The polyisocyanates are not limited to only these examples. These polyisocyanates may be used alone, respectively, or may be used in combination of two or more.

The water-dispersed polyisocyanates can be easily obtained commercially as, for example: trade names of Aquanate 100, Aquanate 110, Aquanate 200, Aquanate 210 and the like manufactured by Nippon Polyurethane Industry Co., Ltd.; trade names of Bayhydur TPLS-2032, SUB-isocyanate L801 and the like manufactured by Sumika Covestro Urethane Co., Ltd.; trade names of Takenate WD-720, Takenate WD-725, Takenate WD-220 and the like manufactured by Mitsui Takeda Chemical Co., Ltd.; and trade name of RESAMINE D-56 and the like manufactured by Dainichiseika Color & Chemicals Mfg. Co., Ltd.

The water-dispersed blocked polyisocyanates are obtained by blocking the isocyanate groups of the water-dispersed polyisocyanates with blocking agents. Examples of the blocking agents include diethyl malonate, ethyl acetoacetate, ε-caprolactam, butanone oxime, cyclohexanone oxime, 1,2,4-triazole, dimethyl-1,2,4-triazole, 3,5-dimethylpyrazole, and imidazole, but the blocking agents are not limited to only these examples. These blocking agents may be used alone, respectively, or may be used in combination of two or more. Among these blocking agents, the ones, which cleave at 160° C. or lower, preferably 150° C. or lower, are desirable. Examples of the preferable blocking agents include butanone oxime, cyclohexanone oxime, and 3,5-dimethylpyrazole. Among them, butanone oxime is more preferable.

The water-dispersed blocked polyisocyanates can be easily obtained commercially as, for example: trade names of Takenate WB-720, Takenate WB-730, Takenate WB-920 and the like manufactured by Mitsui Takeda Chemical Co., Ltd.; and trade names of Bayhydur BL116, Bayhydur BL5140, Bayhydur BL5235, Bayhydur TPLS2186, Desmodur VPLS2310 and the like manufactured by Sumika Covestro Urethane Co., Ltd.

The aminoplast resins are addition-condensates of formaldehyde and compounds having amino groups such as melamine and guanamine. The aminoplast resins are also called amino resins.

Examples of the aminoplast resins include: melamine resins such as dimethylol melamine, trimethylol melamine, tetramethylol melamine, pentamethylol melamine, hexamethylol melamine, fully alkylated methylated melamine, fully alkylated butylated melamine, fully alkylated isobutylated melamine, fully alkylated mixed etherified melamines, methylol group type methylated melamine, imino group type methylated melamine, methylol group type mixed etherified melamines and imino group type mixed etherified melamines; and guanamine resins such as butylated benzoguanamine, methyl/ethyl mixed alkylated benzoguanamine, methyl/butyl mixed alkylated benzoguanamine and butylated glycoluril, but the aminoplast resins are not limited to only these examples. These aminoplast resins may be used alone, respectively, or may be used in combination of two or more.

The aminoplast resins can be easily obtained commercially as, for example, trade names of MYCOAT 506, MYCOAT 1128, CYMEL 232, CYMEL 235, CYMEL 254, CYMEL 303, CYMEL 325, CYMEL 370, CYMEL 771, and CYMEL 1170 and the like manufactured by Mitsui Cytec Co., Ltd.

Usually, an amount of the aminoplast resins is preferable to adjust a mass ratio of a solid content of the polymer components to a solid content of the aminoplast resins [solid content of the polymer components/solid content of the aminoplast resins] contained in the emulsion particles to from 60/40 to 99/1.

Among the above-mentioned cross-linking agents, the addition-polymerizable oxazolines are preferable from the viewpoint of further improving adhesion to corona-treated PET, OPP and the like.

In the present invention, in addition to the above-mentioned cross-linking agents, for example, the cross-linking agents such as carbodiimide compounds and polyvalent metal compounds typified by zirconium compounds, zinc compounds, titanium compounds, aluminum compounds, etc. can be used within a range in which the objects of the present invention are not impaired.

<Glass Transition Temperature of Polymer Component>

The glass transition temperature of the polymer component can be easily adjusted by adjusting the composition of the monomers used for the monomer components.

In the present specification, the glass transition temperature (Tg) of the polymer component means a temperature obtained with glass transition temperatures each obtained on a homopolymer of each of monomers used for the monomer components constituting the polymer component, based on the Fox equation represented by the following formula.

$$1/Tg=\Sigma(Wm/Tgm)/100$$

[In the formula, Wm indicates a content (% by mass) of a monomer <m> in the monomer components constituting the polymer component, and Tgm indicates a glass transition temperature (absolute temperature: K) of the homopolymer of the monomer <m>.]

The glass transition temperatures of the polymer components are, for example, 95° C. for a homopolymer of acrylic acid, 130° C. for a homopolymer of methacrylic acid, 105° C. for a homopolymer of methylmethacrylate, 100° C. for a homopolymer of styrene, 83° C. for a homopolymer of cyclohexyl methacrylate, 20° C. for a homopolymer of n-butyl methacrylate, −70° C. for a homopolymer of 2-ethylhexyl acrylate, −56° C. for a homopolymer of n-butyl acrylate, 55° C. for a homopolymer of hydroxyethyl methacrylate, 165° C. for a homopolymer of acrylamide, 130° C. for a homopolymer of 4-(meth) acryloyloxy-2,2,6,6-tetramethylpiperidine, 130° C. for a homopolymer of 4-methacryloyloxy-1,2,2,6,6-pentamethylpiperidin, 100° C. for a homopolymer of 2-[2-hydroxy-5'-methacryloyloxyethylphenyl]-2H-benzotriazole, and 100° C. for a homopolymer of 2-isopropenyl-2-oxazoline.

The glass transition temperature of the polymer component is the value obtained based on the Fox equation. A measured value of the glass transition temperature of the polymer component is preferable to be the same value as the value obtained based on the Fox equation. The measured value of the glass transition temperature of the polymer component can be obtained, for example, by measuring a differential scanning calorimetry.

In the present specification, the glass transition temperature of the polymer component means the glass transition temperature obtained based on the above equation unless otherwise specified. For monomers whose glass transition temperatures are unknown, such as special monomers and polyfunctional monomers, when a total amount of the monomers whose glass transition temperatures are unknown in the monomer components is 10% by mass or less, the glass transition temperatures can be determined with only monomers whose glass transition temperatures are known. When the total amount of the monomers whose glass transition temperatures are unknown in the monomer components is more than 10% by mass, glass transition temperatures of (meth) acrylic type adhesive resins can be obtained with the differential scanning calorimetry analysis (DSC), a differential thermal analysis (DTA), thermomechanical analysis (TMA), and the like.

As measuring devices for the differential scanning calorimetry, for example, a measuring device manufactured by Seiko Instruments Inc., as the product number of DSC220C can be used. Further, when measuring the differential scanning calorimetry, methods of drawing a differential scanning calorimetry (DSC) curve, methods of obtaining a first derivative curve from the differential scanning calorimetry (DSC) curve, methods of performing a smoothing process, and methods of obtaining a target peak temperature are not particularly limited. For example, when the above measuring devices are used, drawing may be performed from the data obtained with the measuring device. At that time, an analysis software capable of performing a mathematical processing can be used. As the analysis software, for example, an analysis software manufactured by Seiko Instruments Inc., as the product number of EXSTAR6000 can be used, but the analysis software is not particularly limited to only that example. The peak temperature thus obtained may include an error of about 5° C. above or below due to drawing.

The emulsion particles, containing the polymer component having the glass transition temperature of 55° C. or more and the polymer component having the glass transition temperature of less than 55° C. in the present invention, may be core-shell emulsion particles in which the polymer component having the glass transition temperature of 55° C. or more and the polymer component having the glass transition temperature of less than 55° C. are layered, or may be emulsion particles in which the polymer component having the glass transition temperature of 55° C. or more and the polymer component having the glass transition temperature of less than 55° C. are uniformly mixed. Alternatively, the emulsion particles in the present invention may be a mixture of emulsion particles composed of the polymer component having the glass transition temperature of 55° C. or more and emulsion particles composed of the polymer component having the glass transition temperature of less than 55° C. As the core-shell emulsion particles, the core portion may be composed of the polymer component having the glass transition temperature of 55° C. or more, and the shell portion may be composed of the polymer component having the glass transition temperature of less than 55° C., or vice versa. When the emulsion particles contain the polymer component having the glass transition temperature of 55° C. or more and the polymer component having the glass transition temperature of less than 55° C., both adhesion to substrates and blocking resistance can be achieved at the same time.

As long as the emulsion particles include the polymer component having the glass transition temperature of 55° C. or more and the polymer component having the glass transition temperature of less than 55° C., the emulsion particles, for example, may have the substantially uniform composition. However, as the emulsion particle structure, the emulsion particles are preferable to have the layered structure. The layered structure specifically refers to the core-shell structure composed of the shell portion of the outermost layer and the core portion inside the shell portion. The core portion may have a substantially uniform composition or may have a layered structure (further core-shell structure). The core portion is preferable to have a substantially uniform composition.

Preferably, the emulsion particles, containing the polymer component having the glass transition temperature of 55° C. or more and the polymer component having the glass transition temperature of less than 40° C., may be core-shell emulsion particles in which the polymer component having the glass transition temperature of 55° C. or more and the polymer component having the glass transition temperature of less than 40° C. are layered, or may be a mixture of emulsion particles composed of the polymer component having the glass transition temperature of 55° C. or more and emulsion particles composed of the polymer component having the glass transition temperature of less than 40° C. As the core-shell emulsion particles, the core portion may be composed of the polymer component having the glass transition temperature of 55° C. or more, and the shell portion may be composed of the polymer component having the glass transition temperature of less than 40° C., or vice versa. When the emulsion particles contain the polymer component having the glass transition temperature of 55° C. or more and the polymer component having the glass transition temperature of less than 40° C., both adhesion to the substrates and blocking resistance can be further achieved at the same time.

A ratio of a content of the polymer component having the glass transition temperature of 55° C. or more to a content of the polymer component having the glass transition temperature of less than 55° C. is, as a mass ratio of "the content of the polymer component having the glass transition temperature of 55° C. or more" "the content of the polymer component having the glass transition temperature of less than 55° C.", preferably 1:99 to 70:30, more preferably 1:99 to 40:60, and particularly preferably 1:99 to 30:70. When the emulsion particles contain two or more kinds of polymer components, the average glass transition temperature is preferably 0 to 30° C.

Among the emulsion particles contained in the emulsion for water-based inks of the present invention, the emulsion particles in which the core portion contains the polymer component having the glass transition temperature of 55° C. or more, and the shell portion contains the polymer component having the glass transition temperature of 55° C. or less, are preferable. Here, when the emulsion particles are composed of the shell portion as the outermost layer and the core portion having the substantially uniform composition, "the glass transition temperature of the shell portion" and "the glass transition temperature of the core portion" have literal meanings. When "the core portion" is composed of multiple layers, the "the glass transition temperature of the shell portion" means the glass transition temperature of the outermost layer, and the "the glass transition temperature of the core portion" means the average glass transition temperature of the core portion composed of the multiple layers.

The glass transition temperature of the polymer components of the core portion is preferably 60° C. or more, more preferably 70° C. or more, further preferably 80° C. or more, particularly preferably 90° C. or more, and most preferably 95° C. or more. Further, an upper limit of the glass transition temperature of the polymer components of the core portion is preferably as high as possible from the viewpoint of blocking resistance. However, since film formation failure may occur when the glass transition temperature is too high, the upper limit of the glass transition temperature is preferably 300° C. or less, and more preferably 200° C. or less.

The glass transition temperature of the polymer component of the shell portion is preferably 30° C. or less, more preferably 25° C. or less, further preferably 20° C. or less, particularly preferably 15° C. or less, and most preferably 10° C. or less. Further, a lower limit of the glass transition temperature of the polymer component of the shell portion is preferably −70° C. or more, more preferably −50° C. or more, further preferably −30° C. or more, and particularly preferably −20° C. or more.

As a combination of the glass transition temperature of the polymer components of the core portion and the glass transition temperature of the polymer component of the shell portion:

preferably, the glass transition temperature of the polymer components of the core portion is 55° C. or more (more preferably, the glass transition temperature of the polymer components of the core portion is further 200° C. or less), and the glass transition temperature of the polymer component of the shell portion is 25° C. or less (more preferably, the glass transition temperature of the polymer component of the shell portion is further −20° C. or more);

more preferably, the glass transition temperature of the polymer components of the core portion is 90° C. or more (more preferably, the glass transition temperature of the polymer components of the core portion is further 200° C. or less), and the glass transition temperature of the polymer component of the shell portion is less than 55° C. (more preferably, the glass transition temperature of the polymer component of the shell portion is further −20° C. or more); and further preferably, the glass transition temperature of the polymer components of the core portion is 90° C. or more (more preferably, the glass transition temperature of the polymer components of the core portion is further 200° C. or less), and the glass transition temperature of the polymer component of the shell portion is 25° C. or less (more preferably, the glass transition temperature of the polymer component of the shell portion is further −20° C. or more).

The shell portion preferably contains the piperidine group-containing monomer, the addition-polymerizable oxazoline, and/or the hydroxyl group-containing (meth) acrylate.

The piperidine group-containing monomer, the addition-polymerizable oxazoline, and the hydroxyl group-containing (meth) acrylate are each contained in the shell portion in an amount of preferably 0.1 to 30% by mass, more preferably 0.2 to 20% by mass, and further preferably 0.5 to 10% by mass, with respect to 100% by mass of the total amount of the monomers constituting the shell portion.

The core portion preferably contains styrene type monomers. A content of the styrene type monomers in the core portion is preferably 1 to 70% by mass with respect to 100% by mass of the total amount of the monomers constituting the core portion.

<Acid Value Derived from the Carboxyl Groups of the Emulsion Particles>

The acid value derived from the carboxyl groups of the emulsion particles contained in the emulsion for water-based inks of the present invention is 0 to 6, and can be easily adjusted by adjusting the composition of the monomers used for the polymerization of the emulsion particles.

The acid value derived from the carboxyl groups of the emulsion particles is the mass of potassium hydroxide in milligrams that is required to neutralize the carboxyl groups present in one gram of the emulsion particles. When components to be the emulsion particles by polymerizing are ethylenically unsaturated double bond-containing monomers and the emulsion particles do not contain the other carboxyl groups, it is possible to approximate the mass of potassium hydroxide in milligrams that is required to neutralize carboxyl groups present in one gram of the ethylenically unsaturated double bond-containing monomer components as the acid value. In the present specification, the acid value derived from the carboxyl groups of the emulsion particles is a value that does not include the acid value derived from the acid groups other than the carboxyl groups in the emulsifiers and the initiators. The acid value is preferably 0 to 5, more preferably 0 to 4, further preferably 0 to 1, and particularly preferably 0. In the emulsion for water-based inks of the present invention, by lowering the acid value derived from the carboxyl groups of the emulsion particles, the image uniformity when used as inks can be improved.

<Other Properties>

In the emulsion for water-based inks of the present invention, the weight average molecular weight of the polymer components constituting the emulsion particles is preferably 100,000 or more, more preferably 300,000 or more, further preferably 550,000 or more, and particularly preferably 600,000 or more, from the viewpoint of further improving water resistance and adhesion. An upper limit of the weight average molecular weight of the polymer components is preferably 5 million or less, from the viewpoint of improving the film forming property and water resistance.

In this specification, the weight average molecular weight means a weight average molecular weight (in terms of polystyrene) measured with a gel permeation chromatography [manufactured by TOSOH Corporation, product number: HLC-8120GPC, column: TSKgel G-5000HXL and TSKgel GMHXL-L are used in series].

A minimum film-forming temperature of the emulsion for water-based inks of the present invention is preferably 60° C. or less, more preferably 50° C. or less, and further preferably 40° C. or less, from the viewpoint of further improving adhesion. Further, a lower limit of the minimum film forming temperature of the emulsion for water-based inks of the present invention is preferably −5° C. or more, more preferably 5° C. or more, and further preferably 10° C. or more, from the viewpoint of further improving water resistance and blocking resistance.

In the present specification, the minimum film forming temperature of the emulsion means a temperature at which a crack of a coating of the emulsion is generated during drying. The coating of the emulsion is formed by coating the emulsion on a glass plate, which is placed on a thermal gradient tester, with an applicator so as to have a thickness of 0.2 mm.

The content of the non-volatile matter in the emulsion for water-based inks of the present invention is preferably 30% by mass or more, and more preferably 40% by mass or more, from the viewpoint of improving productivity, and is preferably 70% by mass or less, and more preferably 60% by mass or less, from the viewpoint of improving handling ability.

In the present specification, the content of the non-volatile matter in the emulsion means a value obtained by weighing 1 g of the emulsion, drying it in a hot air dryer at a temperature of 110° C. for 1 hour, obtaining a residue as the non-volatile matter, and calculating based on the following equation.

[Content of Non-volatile Matter in Emulsion (mass %)]=([Mass of Residue]÷[1 g of Emulsion])× 100

A mean particle diameter of the emulsion particles contained in the emulsion for water-based inks of the present invention is preferably 30 nm or more, more preferably 50 nm or more, and further preferably 70 nm or more, from the viewpoint of improving the storage stability of the emulsion particles, and is preferably 250 nm or less, and more preferably 200 nm or less, from the viewpoint of further improving image uniformity and water resistance.

In the present specification, the mean particle diameter of the emulsion particles means a volume mean particle diameter obtained by measuring with a particle size distribution measuring device based on a dynamic light scattering method [manufactured by Particle Sizing Systems LLC, trade name: NICOMP Model 380].

[Ink Composition for Water-Based Inks]

The ink composition for water-based inks of the present invention contains the emulsion for water-based inks, and preferably, further contains pigments and organic solvents. Examples of the pigments include organic pigments and inorganic pigments, and the pigments may be used alone, respectively, or may be used in combination of two or more. In addition, if necessary, they can be used in combination with extender pigments.

Examples of the organic pigments include azo pigments such as benzidin and hansa yellow, diazo pigments, azomethine pigments, methine pigments, anthraquinone pigments, phthalocyanine pigments such as phthalocyanine blue, perinone pigments, perylene pigments, diketopyrrolopyrrole pigments, thioindigo pigments, iminoisoindrin pigments, isoindolinone pigments such as iminoisoindolinone, dioxazine pigments, quinacridone pigments such as quinacridone red and quinacridone violet, flavantron pigments, indantron pigments, anthrapyrimidine pigments, carbazole pigments, monoallylide yellow, diallylide yellow, benzoimidazolone yellow, trill orange, naphthol orange, and quinophthalone pigments.

The hue is not particularly limited, and any chromatic pigments such as yellow, magenta, cyan, blue, red, orange, and green can be used. For specific examples, one or more products with product numbers selected from the group consisting of C.I. Pigment Yellow, C.I. Pigment Red, C.I. Pigment Orange, C.I. Pigment Violet, C.I. Pigment Blue and C.I. Pigment Green can be used.

These organic pigments may be used alone, respectively, or may be used in combination of two or more.

Examples of the inorganic pigments include titanium dioxide, antimony trioxide, zinc white, lithopon, lead white, red iron oxide, black iron oxide, chromium oxide green, carbon black, chrome yellow, molybdenum red, ferric ferrocyanide (prusian blue), ultramarine, and lead chromate, and further include: pigments having flat shapes such as mica, clay, aluminum powder, talc, and aluminum silicate; and the extender pigments such as calcium carbonate, magnesium hydroxide, aluminum hydroxide, barium sulfate and magnesium carbonate. Further, examples of the carbon black include furnace black, thermal lamp black, acetylene black, and channel black. These inorganic pigments may be used alone, respectively, or may be used in combination of two or more.

An amount of the pigments per 100 parts by mass of the non-volatile matter of the ink composition for water-based inks is preferably 50 parts by mass or more, and more preferably 60 parts by mass or more, from the viewpoint of improving concealing property of the printed matter formed with the ink composition for water-based inks of the present invention, and is preferably 90 parts by mass or less from the viewpoint of further improving adhesion.

Examples of the organic solvents include: glycols such as propylene glycol, 1,3 propanediol, glycerin, dipropylene glycol, tripropylene glycol, diethylene glycol, triethylene glycol and tetraethylene glycol; monoethylene glycol ethers such as monoethylene glycol monomethyl ether, monoethylene glycol monoethyl ether, monoethylene glycol monopropyl ether, monoethylene glycol monoisopropyl ether, monoethylene glycol monobutyl ether and monoethylene glycol monoisobutyl ether; monopropylene glycol ethers such as monopropylene glycol monomethyl ether, monopropylene glycol monoethyl ether, monopropylene glycol monopropyl ether, monopropylene glycol monoisopropyl ether, monopropylene glycol monobutyl ether and monopropylene glycol monoisobutyl ether; ethers of polyethylene glycol such as monomethyl ether of polyethylene glycol (number of moles of EO added=2 to 10, preferably 2 to 4), monoethyl ether of polyethylene glycol (number of moles of EO added=2 to 10, preferably 2 to 4), monopropyl ether of polyethylene glycol (number of moles of EO added=2 to 10, preferably 2 to 4), monoisopropyl ether of polyethylene glycol (number of moles of EO added=2 to 10, preferably 2 to 4), monobutyl ether of polyethylene glycol (number of moles of EO added=2 to 10, preferably 2 to 4), and monoisobutyl ether of polyethylene glycol (number of moles of EO added=2 to 10, preferably 2 to 4); and ethers of polypropylene glycol such as monomethyl ether of polypropylene glycol (number of moles of EO added=2 to 10, preferably 2 to 4), monoethyl ether of polypropylene glycol (number of moles of EO added=2 to 10, preferably 2 to 4), monopropyl ether of polypropylene glycol (number of moles of EO added=2 to 10, preferably 2 to 4), monoisopropyl ether of polypropylene glycol (number of moles of EO added=2 to 10, preferably 2 to 4), monobutyl ether of polypropylene glycol (number of moles of EO added=2 to 10, preferably 2 to 4), and monoisobutyl ether of polypropylene glycol (number of moles of EO added=2 to 10, preferably 2 to 4). Among them, propylene glycol, diethylene glycol, triethylene glycol, diethylene glycol monomethyl ether, diethylene glycol monoethyl ether, diethylene glycol monoisopropyl ether, diethylene glycol monobutyl ether, or diethylene glycol monoisobutyl ether is preferable. These organic solvents may be used alone, respectively, or may be used in combination of two or more.

The ink composition for water-based inks of the present invention may contain another emulsion particles other than the emulsion particles contained in the above-mentioned emulsions for water-based ink, within a range in which the objects of the present invention are not impaired.

In addition, the ink composition for water-based inks of the present invention may contain additives such as ultraviolet absorbers, ultraviolet stabilizers, fillers, surfactants, dispersants, thickeners, wetting agents, plasticizers, stabilizers, defoamers, dyes, antioxidants and preservatives, in appropriate amounts within a range in which the objects of the present invention are not impaired. For example, surfactants of acetylene glycol type, of polyether-modified silicone type, of fluorine type, or the like can be added.

The ink composition for water-based inks of the present invention can be suitably used as water-based ink-jet inks. Further, it can be suitably used as water-based inks for films which do not absorb liquids described later. In particular, it can be suitably used as water-based ink-jet inks for films which do not absorb liquids.

In the ink composition for water-based inks of the present invention, use of the ink composition for water-based inks for water-based ink-jet inks is preferable. Further, in the ink composition for water-based inks of the present invention, use of the ink composition for water-based inks for films which do not absorb liquids described later is preferable. Use of the ink composition for water-based inks for water-based ink-jet inks for films which do not absorb liquids is particularly preferable.

[Printed Article]

The ink composition for water-based inks of the present invention can be used for printing conventionally known articles to be printed such as coated papers and resin films, to be able to make printed articles.

<Article to be Printed>

Examples of the articles to be printed preferably include the films which do not absorb liquids, for example, coated papers which do not absorb liquids, and the resin films, which do not absorb liquids, such as: polyester films, for example, polyethylene terephthalates (PET) and the like; polyvinyl chloride films; polypropylene films, for example, biaxially stretched polypropylene films (OPP) and the like; polyethylene films; and nylon films. Among them, biaxially stretched polypropylene film (OPP) or polyethylene terephthalates (PET) is more preferable.

Further, among the films which do not absorb liquids, the films whose surfaces, on which the ink composition for water-based inks of the present invention is printed, are chemically or physically modified with corona treatments, anchor coating treatments or the like are preferable, since the adhesion to the ink composition for water-based inks of the present invention or the adhesion to a coated membrane formed by the ink composition for water-based inks of the present invention becomes more excellent. The corona-treated biaxially stretched polypropylene films (OPP) or the corona-treated polyethylene terephthalates (PET) are particularly preferable.

According to the printed articles obtained by printing the ink composition for water-based inks of the present invention on the articles to be printed, it is possible to provide printed articles having excellent image uniformity and adhesion and excellent blocking resistance.

[Method for Producing Printed Article]

The ink composition for water-based inks of the present invention can be used in conventionally known printing methods (methods for producing printed articles). The printing methods are preferably ink-jet printing methods or gravure printing methods, and more preferably ink-jet printing methods. As the ink-jet printing methods, for example, thermal printing, piezo printing, charge deflection control printing (continuous ejection printing), and the like are preferable.

According to the methods for producing printed articles using the ink composition for water-based inks of the present invention, it is possible to provide methods for producing printed articles which are excellent in image uniformity and adhesion and have excellent blocking resistance.

EXAMPLES

Next, the present invention will be described in more detail based on Examples, but the present invention is not limited to such Examples. In the following examples, unless otherwise specified, "parts" means "parts by mass" and "%" means "% by mass".

<Glass Transition Temperature of Polymer Component>

The glass transition temperature (Tg) of the polymer component was obtained by calculating with the glass transition temperature of the homopolymer of each of the monomers used for the monomer components constituting the polymer component, based on the Fox equation represented by the following formula:

$$1/Tg = \Sigma(Wm/Tgm)/100$$

[In the formula, Wm indicates the content (% by mass) of the monomer <m> in the monomer components constituting the polymer component, and Tgm indicates the glass transition temperature (absolute temperature: K) of the homopolymer of the monomer <m>.]

<Acid Value Derived from Carboxyl Groups of Emulsion Particles>

The acid value derived from the carboxyl groups of the emulsion particles was obtained by approximating the mass of potassium hydroxide in milligrams that is required to neutralize carboxyl groups present in one gram of the used monomer components, as an acid value.

Example 1

716 parts of deionized water were charged in a flask equipped with a dropping funnel, a stirrer, a nitrogen gas introduction pipe, a thermometer and a reflux condenser. A pre-emulsion for first-stage dropping consisting of 209 parts of deionized water, 60 parts of 25% aqueous solution of an emulsifier [manufactured by ADEKA Corporation, trade name: ADEKA REASOAP SR-10], 100 parts of cyclohexyl methacrylate, 250 parts of methyl methacrylate, 100 parts of styrene, 40 parts of n-butyl acrylate, and 10 parts of hydroxyethyl methacrylate was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% aqueous ammonium persulfate solution were added to start polymerization. Then, the rest of the pre-emulsion for dropping and 15 parts of 5% ammonium persulfate aqueous solution were uniformly dropped into the flask over 120 minutes.

After completion of the dropping, the contents in the flask were maintained at 70° C. for 60 minutes. Afterwards a pre-emulsion for second-stage dropping consisting of 209 parts of deionized water, 60 parts of 25% aqueous solution of the emulsifier [manufactured by ADEKA Corporation, trade name: ADEKA REASOAP SR-10], 6 parts of acrylic acid, 134 parts of methyl methacrylate, 50 parts of styrene, 300 parts of 2-ethylhexyl acrylate and 10 parts of hydroxyethyl methacrylate with 15 parts of 5% ammonium persulfate aqueous solution were uniformly dropped into the flask over 120 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to the room temperature, and then filtered through a 300 mesh wire mesh to prepare an emulsion.

The content of the non-volatile matter in this emulsion was 45%, the acid value derived from the carboxyl groups of the emulsion particles was 5.0 mgKOH/g. The emulsion particles were constituted with an inner layer resin and an outer layer resin, and the glass transition temperature of the inner layer resin was 78° C., and the glass transition temperature of the outer layer resin was −25° C.

Example 2

716 parts of deionized water were charged in a flask equipped with a dropping funnel, a stirrer, a nitrogen gas introduction pipe, a thermometer, and a reflux condenser. A pre-emulsion for first-stage dropping consisting of 125 parts of deionized water, 36 parts of 25% aqueous solution of the emulsifier [manufactured by ADEKA Corporation, trade name: ADEKA REASOAP SR-10], 130 parts of cyclohexyl methacrylate, and 170 parts of methyl methacrylate was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 9 parts of 5% ammonium persulfate aqueous solution were uniformly dropped into the flask over 70 minutes.

After completion of the dropping, the contents in the flask were maintained at 70° C. for 60 minutes. Afterwards a pre-emulsion for second-stage dropping consisting of 293 parts of deionized water, 84 parts of 25% aqueous solution of the emulsifier [manufactured by ADEKA Corporation, trade name: ADEKA REASOAP SR-10], 200 parts of methyl methacrylate, 200 parts of styrene, 290 parts of 2-ethylhexyl acrylate and 10 parts of hydroxyethyl methacrylate with 21 parts of 5% ammonium persulfate aqueous solution were uniformly added dropwise to the flask over 170 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to room temperature, and then filtered through a 300 mesh wire mesh to prepare an emulsion.

The content of the non-volatile matter in this emulsion was 45%, the acid value derived from the carboxyl groups of the emulsion particles was 0.0 mgKOH/g. The emulsion particles were constituted with an inner layer resin and an outer layer resin, the glass transition temperature of the inner layer resin was 95° C., and the glass transition temperature of the outer layer resin was 4° C.

Example 3

716 parts of deionized water were charged in a flask equipped with a dropping funnel, a stirrer, a nitrogen gas introduction pipe, a thermometer and a reflux condenser. A pre-emulsion for first-stage dropping consisting of 63 parts of deionized water, 18 parts of 25% aqueous solution of the emulsifier [manufactured by ADEKA Corporation, trade name: ADEKA REASOAP SR-10], 95 parts of methyl methacrylate, 50 parts of styrene and 5 parts of 2-[2'-hydroxy-5'-methacryloyloxyethylphenyl]-2H-benzotriazole was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 5 parts of 5% ammonium persulfate aqueous solution were uniformly dropped into the flask over 30 minutes.

After completion of the dropping, the contents in the flask were maintained at 70° C. for 60 minutes. Afterwards a pre-emulsion for second-stage dropping consisting of 355 parts of deionized water, 42 parts of 25% aqueous solution of the emulsifier [manufactured by ADEKA Corporation, trade name: ADEKA REASOAP SR-10], 530 parts of methyl methacrylate, 50 parts of n-butyl acrylate, 230 parts of 2-ethylhexyl acrylate, 20 parts of hydroxyethyl methacrylate and 20 parts of 4-(meth) acryloyloxy-2,2,6,6-tetramethylpiperidine with 25 parts of 5% ammonium persulfate aqueous solution were uniformly dropped into the flask over 210 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to the room temperature, and then filtered through a 300 mesh wire mesh to prepare an emulsion.

The content of the non-volatile matter in this emulsion was 45%, the acid value derived from the carboxyl groups of the emulsion particles was 0.0 mgKOH/g. The emulsion particles were constituted with an inner layer resin and an outer layer resin, the glass transition temperature of the inner layer resin was 103° C., and the glass transition temperature of the outer layer resin was 23° C.

Example 4

716 parts of deionized water were charged in a flask equipped with a dropping funnel, a stirrer, a nitrogen gas introduction pipe, a thermometer and a reflux condenser. A pre-emulsion for first-stage dropping consisting of 63 parts of deionized water, 18 parts of 25% aqueous solution of the emulsifier [manufactured by ADEKA Corporation, trade name: ADEKA REASOAP SR-10], 140 parts of methyl methacrylate, 5 parts of styrene and 5 parts of acrylamide was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 5 parts of 5% ammonium persulfate aqueous solution were uniformly dropped into the flask over 30 minutes.

After completion of the dropping, the contents in the flask were maintained at 70° C. for 60 minutes. Afterwards a pre-emulsion for second-stage dropping consisting of 355 parts of deionized water, 42 parts of 25% aqueous solution of the emulsifier [manufactured by ADEKA Corporation, trade name: ADEKA REASOAP SR-10], 380 parts of methyl methacrylate, 50 parts of n-butyl acrylate, 330 parts of 2-ethylhexyl acrylate, 20 parts of hydroxyethyl methacrylate and 50 parts of 2-isopropenyl-2-oxazoline with 25 parts of 5% ammonium persulfate aqueous solution were uniformly dropped into the flask over 210 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to the room temperature, and then filtered through a 300 mesh wire mesh to prepare an emulsion.

The content of the non-volatile matter in this emulsion was 45%, the acid value derived from the carboxyl groups of the emulsion particles was 0.0 mgKOH/g. The emulsion particles were constituted with an inner layer resin and an outer layer resin, the glass transition temperature of the inner layer resin was 107° C., and the glass transition temperature of the outer layer resin was −3° C.

Example 5

716 parts of deionized water were charged in a flask equipped with a dropping funnel, a stirrer, a nitrogen gas introduction pipe, a thermometer, and a reflux condenser. A pre-emulsion for first-stage dropping consisting of 63 parts of deionized water, 18 parts of 25% aqueous solution of the emulsifier [manufactured by ADEKA Corporation, trade name: ADEKA REASOAP SR-10], and 150 parts of styrene was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 5 parts of 5% ammonium persulfate aqueous solution were uniformly dropped into the flask over 30 minutes.

After completion of the dropping, the contents in the flask were maintained at 70° C. for 60 minutes. Afterwards a pre-emulsion for second-stage dropping consisting of 355 parts of deionized water, 42 parts of 25% aqueous solution of the emulsifier [manufactured by ADEKA Corporation, trade name: ADEKA REASOAP SR-10], 380 parts of methyl methacrylate, 50 parts of n-butyl acrylate, 330 parts of 2-ethylhexyl acrylate, 20 parts of hydroxyethyl methacrylate and 50 parts of 4-methacryloyloxy-1,2,2,6,6-pentamethylpiperidin with 25 parts of 5% ammonium persulfate aqueous solution were uniformly dropped into the flask over 210 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to the room temperature, and then filtered through a 300 mesh wire mesh to prepare an emulsion.

The content of the non-volatile matter in this emulsion was 45%, the acid value derived from the carboxyl groups of the emulsion particles was 0.0 mgKOH/g. The emulsion particles were constituted with an inner layer resin and an outer layer resin, the glass transition temperature of the inner layer resin was 100° C., and the glass transition temperature of the outer layer resin was −3° C.

Comparative Example 1

716 parts of deionized water were charged in a flask equipped with a dropping funnel, a stirrer, a nitrogen gas introduction pipe, a thermometer and a reflux condenser. A pre-emulsion for first-stage dropping consisting of 209 parts of deionized water, 60 parts of 25% aqueous solution of the emulsifier [manufactured by ADEKA Corporation, trade name: ADEKA REASOAP SR-10], 10 parts of acrylic acid, 200 parts of cyclohexyl methacrylate, 230 parts of 2-ethylhexyl acrylate, 50 parts of n-butyl acrylate and 10 parts of hydroxyethyl methacrylate was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 15 parts of 5% ammonium persulfate aqueous solution were uniformly dropped into the flask over 120 minutes.

After completion of the dropping, the contents in the flask were maintained at 70° C. for 60 minutes. Afterwards a pre-emulsion for second-stage dropping consisting of 209 parts of deionized water, 60 parts of 25% aqueous solution of the emulsifier [manufactured by ADEKA Corporation, trade name: ADEKA REASOAP SR-10], 3 parts of methacrylic acid, 400 parts of methyl methacrylate and 97 parts of butyl arylate with 15 parts of 5% ammonium persulfate aqueous solution were uniformly dropped into the flask over 120 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to the room temperature, and then filtered through a 300 mesh wire mesh to prepare an emulsion.

The content of the non-volatile matter in this emulsion was 45%, the acid value derived from the carboxyl groups of the emulsion particles was 10 mgKOH/g. The emulsion particles were constituted with an inner layer resin and an outer layer resin, the glass transition temperature of the inner layer resin was −21° C. and the glass transition temperature of the outer layer resin was 58° C.

Comparative Example 2

716 parts of deionized water were charged in a flask equipped with a dropping funnel, a stirrer, a nitrogen gas introduction pipe, a thermometer and a reflux condenser. A pre-emulsion for first-stage dropping consisting of 417 parts of deionized water, 120 parts of 25% aqueous solution of the emulsifier [manufactured by ADEKA Corporation, trade name: ADEKA REASOAP SR-10], 6 parts of acrylic acid, 900 parts of methyl methacrylate, 64 parts of styrene and 30 parts of hydroxyethyl methacrylate was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium sulfate aqueous solution was added to start polymerization. Then, the rest of the pre-emulsion for dropping and 30 parts of 5% ammonium persulfate aqueous solution were uniformly dropped into the flask over 240 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to the room temperature, and then filtered through a 300 mesh wire mesh to prepare an emulsion.

The content of the non-volatile matter in this emulsion was 45%, the acid value derived from the carboxyl groups of the emulsion particles was 5.0 mgKOH/g, and the glass transition temperature of the emulsion particles contained in the emulsion was 103° C.

Comparative Example 3

716 parts of deionized water were charged in a flask equipped with a dropping funnel, a stirrer, a nitrogen gas introduction pipe, a thermometer and a reflux condenser. A pre-emulsion for first-stage dropping consisting of 417 parts of deionized water, 120 parts of 25% aqueous solution of the emulsifier [manufactured by ADEKA Corporation, trade name: ADEKA REASOAP SR-10], 6 parts of acrylic acid, 404 parts of methyl methacrylate, 90 parts of styrene, 130 parts of n-butyl methacrylate, 220 parts of 2-ethylhexyl acrylate and 150 parts of n-butyl acrylate was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution was added to start polymerization.

Then, the rest of the pre-emulsion for dropping and 30 parts of 5% ammonium persulfate aqueous solution were uniformly dropped into the flask over 240 minutes.

After completion of the dropping, the contents in the flask were maintained at 70° C. for 60 minutes, the pH was adjusted to 8 by adding 25% aqueous ammonia, and the polymerization was completed. The obtained reacted liquid was cooled to the room temperature, and then filtered through a 300 mesh wire mesh to prepare an emulsion.

The content of the non-volatile matter in this emulsion was 45%, the acid value derived from the carboxyl groups of the emulsion particles was 5.0 mgKOH/g, and the glass transition temperature of the emulsion particles contained in the emulsion was 9° C.

Preparation of Ink Composition 23 parts of a white paste, 10 parts of propylene glycol, 15 parts of diethylene glycol monoisopropyl ether, 0.4 parts of surfactant [KF-6011 manufactured by Shin-Etsu Chemical Industry Co. Ltd.], and ion-exchanged water were added to 22 parts of each of the emulsions obtained in Examples 1 to 4 and Comparative Examples 1 to 3, while stirring with a homodisper at a rotation speed of 1000 min$^{-1}$. An amount of the ion-exchanged water was determined so that the total amount became 100 parts. The mixture was further stirred for 30 minutes, and then filtered with a 3 μm filter [MCP-3-C10S manufactured by Advantech Co., Ltd.] to prepare each ink composition.

The white paste was prepared by dispersing 428 parts of deionized water, 50 parts of dispersant [Discoat N-14 manufactured by Daiichi Kogyo Seiyaku Co., Ltd.,], 60 parts of propylene glycol, 1000 parts of titanium oxide [CR-95 manufactured by Ishihara Sangyo Co., Ltd.], and 200 parts of glass beads (diameter 1 mm) with the homodisper at a rotation speed of 3000 min-1 for 120 minutes, and then filtering with a 300 mesh wire net.

Further, 23 parts of a white paste, 10 parts of propylene glycol, 15 parts of diethylene glycol monobutyl ether, 0.4 parts of surfactant [KF-6011 manufactured by Shin-Etsu Chemical Industry Co., Ltd.], and ion-exchanged water were added to 11 parts of the emulsion obtained in Example 5, while stirring with a homodisper at a rotation speed of 1000 min$^{-1}$. An amount of the ion-exchanged water was determined so that the total amount became 100 parts. The mixture was further stirred for 30 minutes, and then filtered with a 3 μm filter [MCP-3-C10S manufactured by Advantech Co., Ltd.] to prepare a ink composition.

The white paste was prepared by dispersing 428 parts of deionized water, 50 parts of dispersant [Discoat N-14 manufactured by Daiichi Kogyo Seiyaku Co., Ltd.,], 60 parts of propylene glycol, 1000 parts of titanium oxide [CR-95 manufactured by Ishihara Sangyo Co., Ltd.], and 200 parts of glass beads (diameter 1 mm) with the homodisper at a rotation speed of 3000 min$^{-1}$ for 120 minutes, and then filtering with a 300 mesh wire net.

Preparation of Inkjet Printed Article

Each of the ink compositions prepared from the emulsions obtained in each of Examples and Comparative Examples was put into a print evaluation device (manufactured by Genesis Co., Ltd.) equipped with an inkjet recording head "KJ4B-YH06WST-STDV" (manufactured by Kyocera Corporation) in an environment with a temperature of 25±1° C. and a relative humidity of 30±5%.

A head voltage of 26 V, a frequency of 4 kHz, an appropriate amount of discharged liquid of 12 pl, a head temperature of 32° C., a resolution of 600 dpi, and a negative pressure of −4.0 kPa were set.

A corona-treated PET (Taiko Polyester Film FE2001, manufactured by Futamura Chemical Co., Ltd.), as a recording medium, was fixed to a transport table in a direction so that a longitudinal direction and a transport direction of the recording medium were the same.

A print command was transferred to the print evaluation device, and the ink composition was printed on the recording medium by an inkjet recording method as a solid image having a printing amount of 100% (12 pl, 600×600 dpi).

Immediately after that, the solid image was dried in a dryer at 70° C. for 10 seconds.

The obtained images were investigated on the following properties. The results are shown in Table 1. If the image has at least one of evaluation C in the properties, the image was determined to be unacceptable.

(1) Image Uniformity

The solid image was visually observed and the uniformity of the image was evaluated according to the following criteria.
- A: No white streaks or color unevenness occur in the solid image.
- B: Some white streaks are seen in the solid image.
- C: White streaks and color unevenness are remarkably generated in the solid image.

(2) Blocking Resistance

The corona-untreated surface of PET was put on the printed surface of the printed article on which the solid image was printed to be a stacked layer. Then, after applying a load of 2 N/cm$^2$ at 25° C. for 1 hour to the stacked layer, PET was quickly peeled off, and the blocking property was evaluated according to the following criteria.
- A: No resistance at all
- B: Almost no resistance
- C: Remarkably resistant (3) Adhesion The printed article on which the solid image was printed was rubbed with a nail to confirm the adhesion.

(Evaluation Criteria)
- A: No peeling of the printed surface occurs.
- B: The printed surface hardly peels off.
- C: The printed surface is peeled off.

polypropylene films such as biaxially stretched polypropylene films (OPP); polyethylene films; nylon films; and the like.

The invention claimed is:

1. An ink composition for water-based inks comprising an emulsion and an organic solvent, said emulsion comprising an emulsion particle containing a polymer component having a glass transition temperature of 55° C. or more and a polymer component having a glass transition temperature of less than 55° C., and said emulsion particle having an acid value derived from carboxyl groups of 0 to 6, wherein said polymer components contained in said emulsion particle have been obtained by emulsion-polymerization of monomer components, said monomer components comprising a monomer component selected from the group consisting of piperidine group-containing monomers, nitrogen atom-containing monomers, and additional-polymerizable oxazolines, and wherein said organic solvent comprises an organic solvent selected from the group consisting of propylene glycol, diethylene glycol, triethylene glycol, diethylene glycol monomethyl ether, diethylene glycol monoethyl ether, diethylene glycol monoisopropyl ether, diethylene glycol monobutyl ether, and diethylene glycol monoisobutyl ether.

2. The ink composition for water-based inks according to claim 1, wherein said emulsion particle has a core-shell structure composed of a shell portion of the outermost layer and a core portion inside said shell portion, and

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| Emulsion | Acid value (mgKOH/g) | | 5.0 | 0.0 | 0.0 | 0.0 | 0.0 | 10 | 5.0 | 5.0 |
| | Glass transition temperature (° C.) | Inner layer | 78 | 95 | 103 | 107 | 100 | -21 | 103 | 9 |
| | | Outer layer | -25 | 4 | 23 | -3 | -3 | 58 | — | — |
| Ink composition | Image uniformity | | B | A | A | A | A | C | C | C |
| | Blocking resistance | | A | A | A | A | A | B | A | C |
| | Adhesion | | B | B | A | A | A | B | C | B |

From the results in Table 1, it was found that the ink compositions of the Examples were superior to the ink compositions of the Comparative Examples in image uniformity, blocking resistance and adhesion.

INDUSTRIAL APPLICABILITY

According to the emulsion for water-based inks and the ink composition for water-based inks containing the same of the present invention, an emulsion for water-based inks and an ink composition for water-based inks containing the same having excellent image uniformity and adhesion, and suppressing blocking, can be provided. Particularly, the emulsion for water-based inks and the ink composition for water-based inks containing the same of the present invention can be suitably used for printing on recording media for commercial printing using resin films which do not absorb liquids, for example: coated papers; polyester films such as polyethylene terephthalate (PET): polyvinyl chloride films;

wherein said core portion contains said polymer component having said glass transition temperature of 55° C. or more, and said shell portion contains said polymer component having said glass transition temperature of less than 55° C.

3. The ink composition for water-based inks according to claim 2, wherein said shell portion contains a polymer component having a glass transition temperature of 25° C. or less.

4. The ink composition for water-based inks according to claim 2, wherein said core portion contains a polymer component having a glass transition temperature of 90° C. or more.

5. The ink composition for water-based inks according to claim 1, wherein said monomer components comprises a monomer component selected from the group consisting of piperidine group-containing monomers and additional-polymerizable oxazolines.

* * * * *